United States Patent [19]

Ito et al.

[11] Patent Number: 5,397,657
[45] Date of Patent: * Mar. 14, 1995

[54] METHOD FOR INCREASING THE ELECTRICAL CONDUCTIVITY OF A THERMAL SPRAYED INTERCONNECTOR FOR A SOLID ELECTROLYTE FUEL CELL

[75] Inventors: Shigenori Ito, Kasugai; Kiyoshi Okumura, Tajimi; Katsuki Yoshioka, Nagoya, all of Japan

[73] Assignee: NGK Insulators, Ltd., Japan

[*] Notice: The portion of the term of this patent subsequent to Jul. 26, 2011 has been disclaimed.

[21] Appl. No.: 116,265

[22] Filed: Sep. 3, 1993

Related U.S. Application Data

[63] Continuation of Ser. No. 825,090, Jan. 24, 1992, abandoned.

[30] Foreign Application Priority Data

Jan. 28, 1991 [JP] Japan .................. 3-025245

[51] Int. Cl.⁶ .......................................... H01M 8/10
[52] U.S. Cl. ............................. 429/30; 429/31; 429/193; 427/115; 427/453
[58] Field of Search .............. 429/193, 30, 31, 33; 427/115, 453; 501/152

[56] References Cited

U.S. PATENT DOCUMENTS

| | | | |
|---|---|---|---|
| 4,562,124 | 12/1985 | Ruka | 429/30 |
| 4,614,628 | 9/1986 | Hsu et al. | |
| 4,631,238 | 12/1986 | Ruka | 429/30 |
| 4,749,632 | 6/1988 | Flanoermeyer et al. | 429/12 |
| 4,910,100 | 3/1990 | Nakanishi et al. | 429/32 |

FOREIGN PATENT DOCUMENTS

| | | |
|---|---|---|
| 0223083 | 5/1987 | European Pat. Off. |
| 58-161777 | 9/1983 | Japan . |
| 61-198569 | 9/1986 | Japan . |
| 61-198570 | 9/1986 | Japan . |
| 2-288160 | 11/1990 | Japan . |
| 2154614 | 9/1985 | United Kingdom . |

OTHER PUBLICATIONS

Cell Debate, "Characterization of CA doped LACRO₃ ...," Iwata et al. Sep. 17–19, 1991, p. 205.
World Patents Index Week 05, Derwent Publications Ltd. London, GB; AN 75-08484W & JP-B-50 000 360 (Agency Ind Sci & Tech) 8 Jan. 1975. Abstract.
Solid State Ionics, vol. 22, No. 2–3, Jan. 1987, Amsterdam NL pp. 241–246; O. Yamamoto et al.: 'Perovskite-Type Oxides as Oxygen Electrodes for High Temperature Oxide Fuel Cells'.
Journal of Materials Science, vol. 23, No. 10, Oct. 1988, London GB, pp. 3764–3770; M. Scagliotti and All: 'Structural properties of plasma-sparyed zirconia-based electrolytes'.

*Primary Examiner*—John S. Maples
*Attorney, Agent, or Firm*—Parkhurst, Wendel & Rossi

[57] ABSTRACT

A method for producing an airtight and thin lanthanum chromite film having a splendid electrical conductivity including providing an air electrode film on a porous ceramic substrate, thermally spraying a raw material for thermally spraying lanthanum chromite on a surface of the air electrode film to form a thermally sprayed film, and heat treating the thermally sprayed film to form an interconnector. The raw material for thermally spraying lanthanum chromite may contain a doping metal or metals, such as, copper, and zinc, etc. The heat treating is effected preferably at a temperature of at least 1,250° C.

5 Claims, 2 Drawing Sheets

METHOD FOR INCREASING THE ELECTRICAL CONDUCTIVITY OF A THERMAL SPRAYED INTERCONNECTOR FOR A SOLID ELECTROLYTE FUEL CELL

This is a continuation application Ser. No. 07/825,090, filed Jan. 24, 1992, now abandoned.

BACKGROUND OF THE INVENTION

1. Field of the Invention

The present invention relates to a method for producing a lanthanum chromite film and a method for producing an interconnector using the film for solid electrolyte type fuel cells.

2. Description of the Related Art

Recently, fuel cells have attracted attention as electric power generating apparatuses which can directly convert chemical energy of fuels into electrical energy. They are not restricted by Carnot cycle, so that they have essentially high efficiency in energy conversion and can use a variety of fuels, such as, naphtha, natural gas, methanol, coal-reformed gas, and heavy oil. In addition, they show low environmental pollution and their efficiency of electrical power generation is not influenced by a scale of the generation plant, so that they are now a very promising technique.

Particularly, solid electrolyte type fuel cells (to be referred to as "SOFC" hereinafter) are operated at a high temperature of around 1,000° C. Therefore, reactions at the electrodes proceed virgorously without necessitating an expensive noble metal catalyst, such as platinum, polarization of the electrodes is small, and output voltage of the cell is relatively high, so that they have an exceedingly high efficiency in energy conversion as compared with the other fuel cells. Moreover, SOFC are constructed wholly from solid materials, so that they are stable and exhibit a long life.

In these SOFC, generally a fuel electrode and an air electrode of an adjacent element (unit cell) of SOFC are connected in series via an interconnector and joining terminals. Therefore, a thin interconnector is particularly desired in SOFC so as to decrease the electrical resistance therefor.

As a technique of producing a thin interconnector, a chemical vapor deposition (CVD) method or electrochemical vapor deposition (EVD) method can be considered. However, these methods require a large apparatus for forming the interconnector film and can be performed only on a small deposition area and at a slow speed.

A technique of using a plasma thermal spray has been used in the production of SOFC in that it is quick in film-forming speed, simple, and affords a thin and relatively dense film, as described in "Sunshine" Vol. 12, No. 1, 1981, for example. Also, Japanese patent application laid-open Nos. 61-198,569 and 61-198,570 disclose that a raw material consisting of a solid solution of cerium oxide or zirconium oxide and an oxide of a metal of alkaline earth element or rare earth element is pulverized to a desired fineness, and plasma thermal sprayed to form a solid electrolyte film.

However, a film formed by plasma thermal spray has generally such a large porosity that it is poor in airtight property as an interconnector for SOFC, and has cracks or layered defects therein already at the time of completing the plasma thermal spraying. Therefore, fuel leakage occurs during operation of the SOFC to leak hydrogen, carbon monoxide, etc., through the interconnector. As a result, an electromotive force per unit cell of the SOFC becomes smaller than the usual 1 volt, for example, to reduce output of the SOFC and decrease conversion rate of the fuel into electrical power. In order to solve the disadvantages, a way of increasing the interconnector film thickness to prevent the fuel leakage has been considered. However, in such a method, inherent resistance of the SOFC is increased to decrease the output of the SOFC. Therefore, a way has been earnestly desired which can improve airtight property of the interconnector film while making the film thickness thin, in order to improve the output of the SOFC as far as the fuel leakage is prevented.

Meanwhile, lanthanum chromite generally used as a material for the interconnector has such a characteristic property that it can hardly be densified by sintering thereof, so that a densifying agent, such as copper, or zinc, etc., has to be added thereto for withstanding practical use, otherwise lanthanum chromite having an extremely small relative density is obtained.

SUMMARY OF THE INVENTION

An object of the present invention is to provide a method of providing an airtight thin lanthanum chromite film on a substrate, while improving electrical conductivity of the film.

Another object of the present invention is to apply the airtight thin lanthanum chromite film to SOFC to increase output of the SOFC.

A further object of the present invention is to provide a method for producing a superior interconnector film suited to SOFC.

The present invention is a method for producing a lanthanum chromite film, comprising thermal spraying a raw material for thermal spraying lanthanum chromite on a substrate to form a thermal sprayed film, and heat treating the thermal sprayed film to form a lanthanum chromite film.

The present invention is also a method for producing an interconnector for solid electrolyte type fuel cells, comprising thermal spraying a raw material for thermal spraying lanthanum chromite on a surface of a fuel electrode or an air electrode of a solid electrolyte type fuel cell to form a thermal sprayed film, and heat treating the thermal sprayed film to form an interconnector.

The word "a raw material for thermal spraying lanthanum chromite" used herein means a powder of lanthanum chromite or a powder of a material which after heat treatment becomes lanthanum chromite. It may be abbreviated as "the raw material" hereinafter. The powder may be a powder obtained by pulverization, however, preferably a highly fluidizable granulated powder is used.

The expression "thermal spray a raw material for thermal spraying lanthanum chromite on a substrate" used herein means a case of thermal spraying the raw material on a substrate surface, and a case of providing an air electrode film or the like film other than the lanthanum chromite film on a substrate surface, and then thermal spraying the raw material on the surface of the air electrode film or the like film.

The expression "thermal spraying a raw material for thermal spraying lanthanum chromite on a surface of a fuel electrode or an air electrode" used herein means a case of thermal spraying the raw material on a surface of an air electrode film (or fuel electrode film) formed on a surface of a porous substrate of a SOFC, and a case of thermal spraying the raw material on a surface of an air electrode substrate (or fuel electrode substrate) consisting of a raw material for an air electrode (or a raw material for a fuel electrode) of a SOFC.

According to the method of the present invention, the thermal sprayed film of lanthanum chromite is heat treated, so that open pores of the thermal sprayed film of lanthanum chromite for an interconnector are closed thereby to remove defects and micro cracks inherent to a plasma thermal spray film, improve relative density, and decrease porosity to achieve airtight property. By the heat treatment, crystals of the interconnector film become a homogeneous single phase and assume a homogeneous microstructure, so that electro-conductivity of the interconnector can be improved.

By forming the interconnector of SOFC by using such a dense and thin lanthanum chromite film, the fuel leakage at the interconnector can be prevented, while reducing the resistance of the interconnector to reduce the resistance of the SOFC, so that output of the SOFC can remarkably be improved as a result of synergisation of these effects.

The method of the present invention can be carried out into effect if a usual plasma thermal spray device and a usual electrical furnace, etc., for the heat treating are available, so that it can easily be practiced technically as compared with EVD and CVD and it can be performed with a low cost, a high treating speed and in a large treating area.

The lanthanum chromite film produced by the present method has characteristic features that it can be produced airtightly and thinly, so that it can be thermally sprayed on a metal surface to form an electrical conductor while withstanding to high temperature corrosion.

BRIEF DESCRIPTION OF THE DRAWINGS

For a better understanding of the present invention, reference is made to the accompanying drawings, in which.

Numbering in the drawings.

Figure 1:
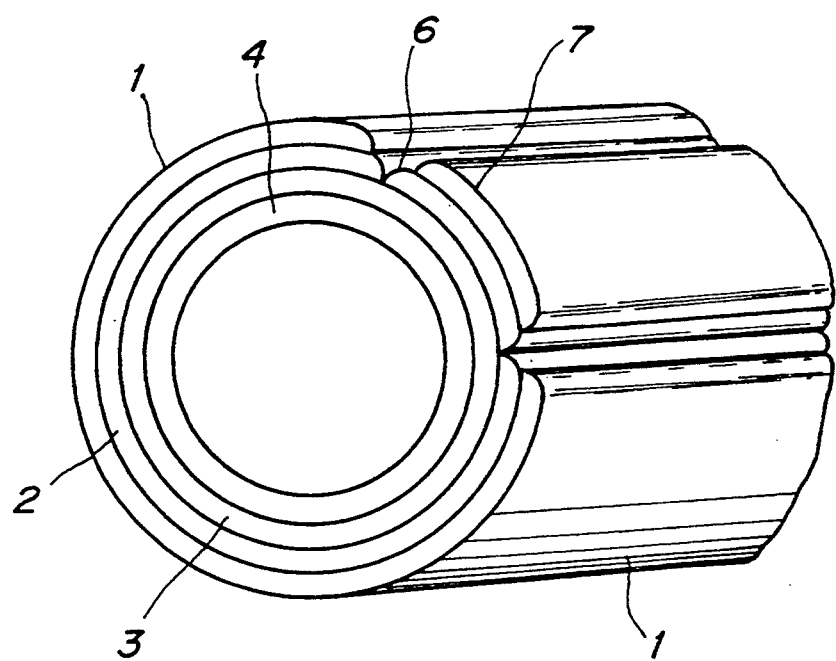
FIG. 1 is a schematic perspective view broken in section of a tubular SOFC.

1 fuel electrode film
2 electrolyte YSZ
3 air electrode film
4 tubular porous ceramic substrate
6 interconnector
7 connection terminal
13 air electrode substrate
21 jig
22 lanthanum chromite film
23 adhesive

DESCRIPTION OF THE PREFERRED EMBODIMENT

Hereinafter, the present method will be explained concretely.

At the stage of synthesizing lanthanum chromite, a mixture of $La_2O_3$ and $Cr_2O_3$ or a composite containing $La_2O_3$ and $Cr_2O_3$ is used. In this mixture or composite, a doping metal oxide, or metal oxides may be added. Particularly, CuO and/or ZnO may be contained in an amount of not more than 2 parts by weight relative to a total amount (100 parts by weight) of the raw material for thermal spray. The mixture or composite may have a composition of $LaCr_{1-x}Cu_xO_3$ or $LaCr_{1-x}Zn_xO_3$ wherein x is $0 < x \leq 0.3$.

Lanthanum chromite after the synthesis is pulverized to obtain a powder. The powder is preferably granulated by adding water or other medium to the powder to form a slurry, and drying the slurry to form a granulated powder. The granulated powder preferably has an average particle diameter of 3–100 $\mu$m. If the average particle diameter is less than 3 $\mu$m, the powder is too fine for the thermal spraying, while if it is larger than 100 $\mu$m, the powder is too coarse to melt during thermal spraying, so that unmelted particles adhere on the substrate surface causing difficulty in densification of the lanthanum chromite film.

These raw materials are plasma thermal sprayed. At normal pressure, particularly at low pressure, the plasma thermal spray can obtain a large effect. Even by a plasma thermal spray at normal pressure, a sufficiently dense airtight lanthanum chromite film can be obtained by the succeeding heat treatment.

The heat treatment is effected preferably at a temperature of not less than 1,250° C. If the temperature is below 1,250° C., a dense thermally sprayed film of lanthanum chromite can hardly be obtained.

Hereinafter, the present invention will be explained in more detail with reference to SOFC and attached drawings.

Referring to FIG. 1 showing an embodiment of tubular SOFC, a tubular porous ceramic substrate 4 has at its outer circumferential surface an air electrode 3 which has at its outer circumferential surface a solid electrolyte film 2 and a fuel electrode film 1. In the upper side region of FIG. 1, an interconnector 6 is arranged on the air electrode 3, and a connection terminal 7 is adhered on the interconnector 6. For connecting plural tubular SOFC in series, the air electrode film 3 of the SOFC is connected to a fuel electrode film 1 of an adjacent SOFC through the interconnector 6 and the connection terminal 7 of the SOFC. For connecting plural tubular SOFC in parallel, the fuel electrode films 1, 1 of adjacent SOFC are connected via Ni felt, etc. At the time of forming the interconnector 6, a thermal sprayed film is formed on the surface of the air electrode film 3 (which is on the porous ceramic substrate 4) and heat treated, according to the present invention.

Figure 2:
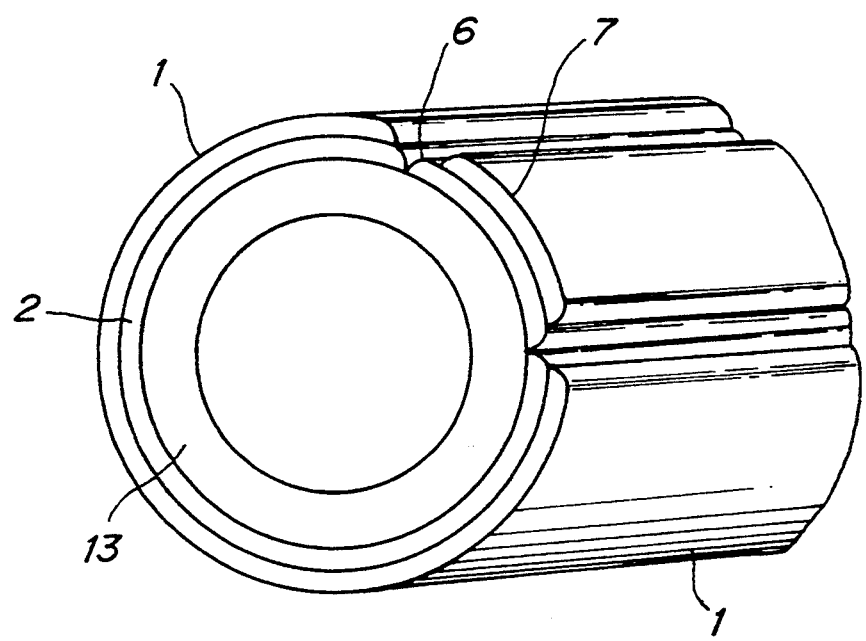
FIG. 2 is a schematic perspective view broken in section of another tubular SOFC.

Alternatively, the fuel electrode film 1 and the air electrode film 3 may be arranged vice versa in FIG. 1. Instead of providing the air electrode film 3 on the surface of the porous substrate 4, a tubular air electrode substrate 13 of a mono layer structure made of a raw material for air electrode may be used, as shown in FIG. 2. In this case, the interconnector 6 is provided directly on the surface of the tubular air electrode substrate 13.

In FIGS. 1 and 2, only an open end of one side of a tubular tubular SOFC is shown. However, the end of the other side (not shown) may be opened, or the end of the other side may be closed to form a bottomed tubular SOFC.

The air electrode may be made of doped or undoped $LaMnO_3$, $CaMnO_3$, $LaNiO_3$, $LaCoO_3$, or $LaCrO_3$, etc. $LaMnO_3$ doped with strontium or calcium is preferable.

The fuel electrode is preferably made of nickel-zirconia cermet or cobalt-zirconia cermet.

The solid electrolyte is preferably made of zirconium oxide or cerium oxide stabilized or partially stabilized with a rare earth element, such as, yttrium, etc.

Hereinafter, the present invention will be explained in more detail with reference to examples.

At first, the following three types of the raw materials were prepared.

Example 1 and Comparative Example 1

120.0 g of $La_2O_3$ of a purity of 99.9% and 56.3 g of $Cr_2O_3$ of a purity of 99.3% were weighed. 800 g of gravel, 200 g of water, and the above two weighed compounds were put in a 2 l capacity ball mill, and mixed for 3 hours to obtain a slurry. The slurry was dried at 110° C. for 20 hrs, and the resultant dried substance was pulverized to a fineness of not more than 149 μm, and calcined at 1,200° C. for 10 hrs to synthesize $LaCrO_3$.

Example 2 and Comparative Example 2

120.0 g of $La_2O_3$ of a purity of 99.9%, 50.7 g of $Cr_2O_3$ of a purity of 99.3%, and 5.9 g of CuO of a purity of 99.5% were weighed. 800 g of gravel, 200 g of water, and the above 3 types of weighed compounds were put in a 2 l ball mill, and mixed for 3 hrs to obtain a slurry. The slurry was dried at 110° C. for 20 hrs, and the resultant dried substance was pulverized to a fineness of not more than 149 μm, and calcined in air at 1,200° C. for 10 hrs to synthesize lanthanum chromite $LaCr_{0.9}Cu_{0.1}O_3$ doped with copper.

Example 3 and Comparative Example 3

120.0 g of $La_2O_3$ of a purity of 99.9%, 50.5 g of $Cr_2O_3$ of a purity of 99.3%, and 6.0 g of ZnO of a purity of 99.5% were weighed. 800 g of gravel, 200 g of water, and the above three types of the weighed compounds were put in a 2 l ball mill, and mixed for 3 hrs to obtain a slurry. The slurry was dried at 110° C. for 20 hrs, and the resultant dried substance was pulverized to a fineness of not more than 149 μm, and calcined in air at 1,200° C. for 10 hrs to synthesize lanthanum chromite $LaCr_{0.9}Zn_{0.1}O_3$ doped with zinc.

Then, the above three types of synthesized lanthanum chromite were individually pulverized in a separate ball mill using a zirconia gravel to respectively obtain a powder containing particles having an average particle diameter of 3.5 μm. Subsequently, 100 parts of each powder was added and mixed with 50 parts of water to obtain a mixture slurry, and the slurry was dried by a spray drier to obtain a granulated powder having an average particle diameter of 40 μm. Thus obtained three types of granulated powder were used respectively for the raw material. The raw materials have the aforedescribed compositions as shown again in the following Table 1 for reference.

Meanwhile, plate shaped substrates made of alumina of a porosity of 20%, length of 30 mm, a width of 30 mm, a thickness of 1 mm were prepared, and the above three types of raw materials were respectively thermally sprayed to a thickness of 500 μm. Thereafter, the substrates made of alumina were removed by grinding to solely leave plasma thermal sprayed films of a thickness of 400 μm. The plasma thermally sprayed films were heat treated in an electrical furnace in a respective heat treating condition as shown in the following Table 1 to obtain each lanthanum chromite film. $N_2$ permeation coefficients and electrical conductivities of the films were measured. The results are also shown in Table 1.

TABLE 1

| | Composition of the raw material | Heat treatment condition | $N_2$ permeating coefficient ($\times 10^{-6}$ $cm^4 g^{-1} s^{-1}$) | Electrical conductivity (Siemens/cm) |
| --- | --- | --- | --- | --- |
| Comparative Example 1-1 | $LaCrO_3$ | non-treated | 5.7 | 3.0 |
| Example 1-2 | " | 1250° C. × 5 hrs | 2.8 | 6.0 |
| Example 1-3 | " | 1350° C. × 5 hrs | 2.8 | 8.2 |
| Example 1-4 | " | 1450° C. × 5 hrs | 1.4 | 8.1 |
| Example 1-5 | " | 1500° C. × 5 hrs | 1.7 | 8.2 |
| Example 1-6 | " | 1550° C. × 5 hrs | 0.1 | 8.5 |
| Comparative Example 2-1 | $LaCr_{0.9}Cu_{0.1}O_3$ | non-treated | 6.5 | 2.1 |
| Example 2-2 | " | 1250° C. × 5 hrs | 3.5 | 7.3 |
| Example 2-3 | " | 1350° C. × 5 hrs | 1.9 | 10.2 |
| Example 2-4 | " | 1450° C. × 5 hrs | 2.2 | 11.3 |
| Example 2-5 | " | 1500° C. × 5 hrs | 2.1 | 12.0 |
| Example 2-6 | " | 1550° C. × 5 hrs | 0.1 | 12.5 |
| Example 2-7 | " | 1550° C. × 20 hrs | 0.1 | 12.2 |
| Comparative Example 3-1 | $LaCr_{0.9}Zn_{0.1}O_3$ | non-treated | 7.8 | 3.2 |
| Example 3-2 | " | 1250° C. × 5 hrs | 3.5 | 7.2 |
| Example 3-3 | " | 1350° C. × 5 hrs | 1.5 | 11.1 |
| Example 3-4 | " | 1450° C. × 5 hrs | 1.1 | 12.0 |
| Example 3-5 | " | 1500° C. × 5 hrs | 0.1 | 12.6 |
| Example 3-6 | " | 1550° C. × 5 hrs | 0.1 | 12.4 |
| Comparative Example 4-1 sintered body) | $LaCrO_3$ $LaCr_{0.9}Cu_{0.1}O_3$ | — — | 10 2.1 | 11.9 11.9 |

As seen from the above Table 1, by the heat treatment the $N_2$ permeation coefficient of the lanthanum chromite film can be decreased compared to that of non-heat treated films. This fact indicates a decrease of penetration holes, indicating a decrease of the porosity and an increase of the relative density of the film. A relative density of not less than 95% of the film can be achieved according to the present invention.

The $N_2$ permeation coefficient is largely decreased with the increase of the heat treatment temperature reaching to a level of $0.1 \times 10^{-6}$ $cm^4 g - 1s^{-1}$. This is considered due to a change of the open pores to closed pores and reduction of the closed pores.

Also, as seen from the above Table 1, the electrical conductivity of the lanthanum chromite is noticeably increased by the heat treatment. For instance, even when Example 1-2 is compared with Comparative Example 1—1, the electrical conductivity is increased to twice or more by the heat treatment at 1,250° C. In other cases, of course a more noticeable increase of the electrical conductivity can be seen.

$N_2$ permeation coefficient

Figure 3:
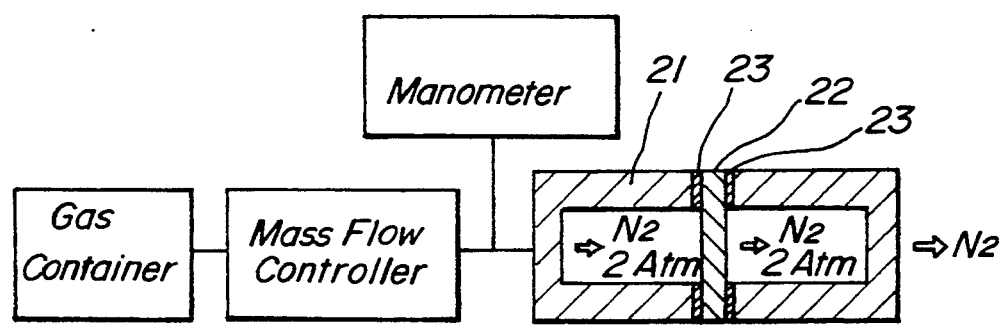
FIG. 3 is a diagram of a measuring device for measuring N2 permeation coefficient.

Each lanthanum chromite film 22 shown in the above Table 1 was set in a jig 21, and the film 22 was sealed to the jig 21 by means of an adhesive 23, as shown in FIG. 3.

A surface of the lanthanum chromite film 22 was exposed to a pressurized nitrogen atmosphere of 2 atm, and the other surface of the film 22 was exposed to a nitrogen atmosphere of atmospheric pressure (measured at room temperature). Then, a flow rate of nitrogen gas flowing through the film 22 from the nitrogen atmosphere of 2 atm to the nitrogen atmosphere of atmospheric pressure was measured to determine a $N_2$ gas permeation coefficient K (dimension is $cm_4 g^{-1} s^{-1}$) based on the following equation.

$$K = (t \cdot Q)/(\Delta P \cdot A)$$

wherein t : sample thickness (cm)
Q : measured flow rate ($cm^3/s$)
$\Delta P$ : pressure difference ($g/cm^2$)
A : surface area of the film opened for $N_2$ permeation ($cm^2$)

Electrical conductivity

Each lanthanum chromite film shown in Table 1 was worked into a disc of a diameter of 14 mm and a thickness having 0.4 mm, and an electrical conductivity was measured using platinum electrodes by means of an alternate current impedance method (in air at 1,000° C.).

Example 4

106.1 g of $La_2O_3$ of a purity of 99.9%, 68.4 g of $MnO_2$ of a purity of 96%, and 10.8 g of $SrCO_3$ of a purity of 99.1% were weighed. 800 g of gravel, 200 g of water, and the above three kinds of weighed compounds were charged in a 2 l capacity of ball mill, and mixed for 3 hrs to prepare a slurry. The slurry was dried at 110° C. for 20 hrs, and the resultant dried substance was pulverized to a fineness of not more than 149 μm, calcined in air at 1,200° C for 10 hrs to synthesize $La_{0.9}Sr_{0.1}MnO_3$.

Starting raw materials for synthesizing the compounds of lanthanum chromite are not restricted solely to oxides, carbonates, nitrates, acetates, sulfates and/or hydroxides of lanthanum and chromium may be used. Moreover, coprecipitation methods from solutions or thermal decomposition method of organic acid salts can be used other than the aforedescribed solid phase reaction method.

Thereafter, the synthesized compound was digested and pulverized to a fineness of an average particle diameter of 1 μm, added and mixed with 20 wt % of cellulose, and formed into a cylindrical shape of an inner diameter of $\phi = 16$ mm and an outer diameter $\phi = 20$ mm by rubber press method. The formed cylinder was fired at 1,500° C. for 10 hrs to obtain a porous air electrode substrate.

The substrate was masked so that it is ready for thermally spraying the raw material synthesized by Examples 1, 2 or 3 longitudinally with a width of 5 mm in an axial direction of the cylindrical substrate, and the raw material was sprayed in the aforementioned manner on the masked substrate surface to a thickness of 100 μm. Then, the substrate was masked solely at the thermally sprayed lanthanum chromite film portion, and the other portions of the substrate were thermally sprayed with yttrium stabilized zirconia (YSZ) which is a material for a solid electrolyte to a thickness of 100 μm. The thus obtained structural body including the substrate was heat treated at 1,500° C. for 5 hrs to obtain an interconnector film made of airtight lanthanum chromite. Thereafter, on the solid electrolyte film surface was coated a slurry consisting of Ni/YSZ (weight ratio is 4/6) and fired at 1,300° C. for 5 hrs to obtain a fuel electrode thereby to prepare a unit cell of a fuel cell. A perspective view thereof is shown in FIG. 2.

According to the present method, the thermally sprayed lanthanum chromite film formed on the substrate is heat treated, so that the open pores of the thermally sprayed interconnector film can be closed, microcracks and defects inherent to a plasma thermally sprayed film can be obviated, and relative density of the interconnector film can be improved to decrease the porosity of the film. By the heat treatment, the crystals in the film become a homogeneous single phase and form a homogeneous microstructure, so that the electrical conductivity of the film can be increased. Because the lanthanum chromite film can be made airtight in this way, the thickness of the film can be made thin at the time of thermally spraying to obtain a thin interconnector film. Moreover, the interconnector of SOFC is formed of a lanthanum chromite film capable of being made thin and airtight to prevent fuel leakage at the interconnector and increase the electrical conductivity of the interconnector thereby to decrease the resistance of the cell, so that the output of the cell can exceedingly be improved.

The present method can be put into practice by using a usual plasma thermal spray device and a usual electrical furnace for the heat treating, so that it can technically easily be carried out into effect as compared with, for example, EVD or CVD, and is low in cost, high in treating speed, and large in treating surface area.

Although the present invention has been explained with specific examples and numeral values, it is of course apparent to those skilled in the art that various changes and modifications thereof are possible without departing from the broad spirit and aspect of the present invention as defined in the appended claims.

What is claimed is:

1. A method for substantially increasing the electrical conductivity of a thermal sprayed interconnector for solid electrolyte fuel cells, comprising thermal spraying a raw material comprising lanthanum chromite on a surface of a fuel electrode or an air electrode of a solid electrolyte fuel cell to form a thermal sprayed film, and heat treating the thermal sprayed film at a temperature of at least 1250° C. to form said interconnector.

2. The method of claim 1, wherein the heat treatment increases the electrical conductivity of the thermal sprayed film by about 100% or more.

3. The method of claim 1, wherein said interconnector has an electrical conductivity of at least 6.0 Siemens/cm.

4. The method of claim 1, wherein said raw material comprises at least one doping metal oxide.

5. The method of claim 4, wherein said doping metal oxide is selected from the group consisting of CuO and ZnO.

* * * * *